(12) United States Patent
Tepass

(10) Patent No.: US 10,408,854 B2
(45) Date of Patent: Sep. 10, 2019

(54) SENSOR ARRANGEMENT FOR MEASURING THE RATE OF ROTATION OF A ROTATING COMPONENT

(71) Applicant: Robert Bosch GmbH, Stuttgart (DE)

(72) Inventor: Bernd Tepass, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/561,398

(22) PCT Filed: Feb. 12, 2016

(86) PCT No.: PCT/EP2016/052979
§ 371 (c)(1),
(2) Date: Sep. 25, 2017

(87) PCT Pub. No.: WO2016/150616
PCT Pub. Date: Sep. 29, 2016

(65) Prior Publication Data
US 2018/0106824 A1 Apr. 19, 2018

(30) Foreign Application Priority Data
Mar. 25, 2015 (DE) .................. 10 2015 205 390

(51) Int. Cl.
*G01P 3/48* (2006.01)
*G01B 7/30* (2006.01)
(Continued)

(52) U.S. Cl.
CPC .................. *G01P 3/48* (2013.01); *G01D 5/20* (2013.01); *G01D 11/245* (2013.01)

(58) Field of Classification Search
CPC ........ G01D 5/20; G01D 5/145; G01D 5/2451; G01D 11/245; G01P 3/48; G01P 3/489; G01P 3/488
See application file for complete search history.

(56) References Cited

U.S. PATENT DOCUMENTS 4,053,829 A * 10/1977 Maruo .................. G01D 5/145
324/247
6,157,186 A 12/2000 Aoki et al.
(Continued)

FOREIGN PATENT DOCUMENTS

DE 10 2009 046 392 A1 5/2011
DE 10 2009 046 439 A1 5/2011
(Continued)

OTHER PUBLICATIONS

International Search Report corresponding to PCT Application No. PCT/EP2016/052979, dated May 4, 2016 (German and English language document) (7 pages).

*Primary Examiner* — Minh N Tang
(74) *Attorney, Agent, or Firm* — Maginot, Moore & Beck LLP

(57) ABSTRACT

A sensor arrangement for measuring a speed of a rotating component includes a rotary encoder and sensor unit. The encoder is coupled to the component, and has a magnetic surface code with alternating North and South poles. The sensor unit has a housing, connecting cable, at least one sensitive measuring element, and contacting arrangement. The element is positioned in the sensor unit such that a main detection direction of the element is angled relative to a main extension direction of the sensor unit. The contacting arrangement electrically connects the element to the cable within the housing. Rotational movement of the encoder changes a magnetic field generated by the code at the element, which is configured to detect the change over a first direction parallel to the main extension direction or over a second direction perpendicular to the main extension direction in order to determine the speed of the component.

15 Claims, 3 Drawing Sheets

(51) Int. Cl.
*G01D 11/24* (2006.01)
*G01D 5/20* (2006.01)

(56) References Cited

U.S. PATENT DOCUMENTS

| | | | | |
|---|---|---|---|---|
| 7,242,180 B1* | 7/2007 | O'Connor | ............... | G01P 1/026 |
| | | | | 324/207.2 |
| 8,604,780 B2* | 12/2013 | Saruki | ................... | G01D 5/145 |
| | | | | 324/207.12 |
| 2012/0198933 A1* | 8/2012 | Steinbrink | ........... | G01D 11/245 |
| | | | | 73/494 |

FOREIGN PATENT DOCUMENTS

| | | |
|---|---|---|
| DE | 10 2009 055 104 A1 | 6/2011 |
| WO | 2005/111544 A2 | 11/2005 |

* cited by examiner

SENSOR ARRANGEMENT FOR MEASURING THE RATE OF ROTATION OF A ROTATING COMPONENT

This application is a 35 U.S.C. § 371 National Stage Application of PCT/EP2016/052979, filed on Feb. 12, 2016, which claims the benefit of priority to Serial No. DE 10 2015 205 390.3, filed on Mar. 25, 2015 in Germany, the disclosures of which are incorporated herein by reference in their entirety.

The present disclosure is directed to a sensor arrangement for measuring the rotational speed of a rotating component, according to the definition of the species as disclosed herein. The subject matter of the present disclosure is also a method for manufacturing a sensor unit for a sensor arrangement for measuring the rotational speed of a rotating component, according to the definition of the species as disclosed herein.

The prior art discloses sensor arrangements for measuring the rotational speed of a rotating component, for example, a shaft, a wheel, etc., said sensor arrangements comprising a rotary encoder which is coupled to the rotating component, and a sensor unit. The rotary encoder has magnetic area encoding having alternating magnetic north poles and south poles. The rotational motion of the rotary encoder produced via the coupling with the rotating component changes at least one spatial component of a magnetic field generated by the magnetic encoding at the location of a sensitive measuring element. The sensitive measuring element detects the changes in the magnetic field, and an evaluation and control unit evaluates the detected magnetic field changes for ascertaining the rotational speed of the rotating rotary encoder or the rotating component. In the typical application case, the sensor arrangement is designed in such a way that the surface encoding runs parallel to, or at an angle of approximately 90° to, the sensing surface of the sensitive measuring element. This means that the main detection direction of the sensitive measuring element is oriented parallel to the main extension direction of the sensor unit. From this dependency of the sensor arrangement, it results that for the sensor unit, one design is used for a rotary encoder arranged laterally next to the sensor unit, and one design is used for a rotary encoder arranged below the sensor unit. Magnetic sensors known per se are generally used as sensitive measuring elements, and may be designed as Hall sensors, AMR sensors, GMR sensors, TMR sensors, or generally as xMR sensors, depending on the use and area of application. The sensitive measuring element which is used may, for example, be part of an ASIC (application-specific integrated circuit).

DE 10 2009 055 104 A1 discloses a magnetic field sensor arrangement for ascertaining the path of moving components, in which spatial components of the magnetic field of a magnet system on the moving component change their direction over the path to be ascertained, and as a result, it is correspondingly possible to detect their position with respect to a fixed sensor. At least one magnet is situated on the component which is movable in a linear manner and in a further degree of freedom, said magnet being an integral part of the magnet system or another magnetic component, the outer circumference of which is arranged at a predetermined spacing, lying opposite at least one fixed sensor which is sensitive to the magnetic field direction, wherein the preferred direction of the magnetic field of the magnet is oriented at a predetermined angle with respect to the path between zero and 90° of the moved component.

SUMMARY

The sensor arrangement for measuring the rotational speed of a rotating component having the features disclosed herein has the advantage that it is no longer necessary to develop one design for the sensor unit for a rotary encoder arranged laterally next to the sensor unit, and one design for a rotary encoder arranged below the sensor unit; rather, the sensor unit for detecting the changes in the magnetic field may be used both for rotary encoders arranged laterally with respect to the sensor unit and for rotary encoders arranged below the sensor unit.

The essence of the present disclosure consists in using the physical peculiarities of the sensitive measuring elements, which are preferably designed as magnetoresistive sensor elements, and a thereby expedient arrangement of the at least one sensitive measuring element in the sensor unit. The at least one sensitive measuring element is oriented at a defined angle in the sensor unit, which enables it to meet the customer requirement with respect to the air gap and possibly other requirements, for a bottom-read rotational speed sensor arrangement in which the rotary encoder is arranged below the at least one sensitive measuring element, and for a side-read rotational speed sensor arrangement in which the rotary encoder is arranged laterally with respect to the at least one sensitive measuring element. The bottom-read or side-read rotational speed sensor arrangement requested by the customer may thus be advantageously implemented using one sensor unit design.

Embodiments of the present disclosure provide a sensor arrangement for measuring the rotational speed of a rotating component, said sensor arrangement comprising a rotary encoder which is coupled to the rotating component and which has magnetic surface encoding having alternating magnetic north poles and south poles, and a sensor unit which comprises a housing, a connecting cable, and at least one sensitive measuring element which is electrically connected to the connecting cable inside the housing via a contacting arrangement. The rotational motion of the rotary encoder changes at least one spatial component of a magnetic field generated by the magnetic encoding at the location of the sensitive measuring element, said sensitive measuring element detecting the changes in the magnetic field for ascertaining the rotational speed of the rotating component. The at least one sensitive measuring element is arranged in the sensor unit in such a way that its main detection direction is at a defined angle with respect to the main extension direction of the sensor unit, wherein the at least one sensitive measuring element detects the changes in the magnetic field caused by a rotary encoder either over a first secondary detection direction running parallel to the main extension direction or over a second secondary detection direction running perpendicular to the main extension direction.

In addition, a method is provided for manufacturing a sensor unit for the sensor arrangement, comprising the following steps: connecting the contacting arrangement of the sensor unit to the connecting cable; gripping the sensor unit and the connecting cable via a gripping tool in each case; positioning the sensor unit by bending the contacting arrangement, so that the main detection direction of the at least one sensitive measuring element of the sensor unit is at the defined angle with respect to the main extension direction; and extrusion-coating the sensor unit and the contacting arrangement with plastic.

By means of the measures and refinements disclosed herein, advantageous improvements on the sensor arrangement for measuring the rotational speed of a rotating component are possible.

It is particularly advantageous that the angle may have a value in the range of 40 to 50°, preferably a value of 45°. By means of such a design of the at least one sensitive measuring element, an equivalent embodiment of the sensor arrangement in terms of circuit technology advantageously results, independently of the design as a side-read rotational speed sensor arrangement or as a bottom-read rotational speed sensor arrangement. Thus, the bottom-read rotational speed sensor arrangement and the side-read rotational speed sensor arrangement may be constituted by one design of the sensor unit.

In an embodiment as a side-read rotational speed sensor arrangement, it may be provided in an additional aspect to specify a first air gap between the rotary encoder and the sensor unit in a first spatial direction which runs parallel to the main extension direction. In an embodiment as a bottom-read rotational speed sensor arrangement, a second air gap may be specified between the rotary encoder and the sensor unit in a second spatial direction which runs perpendicular to the main extension direction. By means of the air gaps, installation tolerances may be compensated for, and an influence by the sensor unit on the rotational motion of the rotary encoder may be advantageously prevented.

In one advantageous embodiment of the sensor arrangement, the sensor unit may comprise an evaluation and control unit which evaluates the detected magnetic field changes for ascertaining the rotational speed of the rotating component.

A compact and functionally reliable embodiment of the sensor arrangement results if the at least one sensitive measuring element and the evaluation and control unit are designed as an application-specific integrated circuit (ASIC) having a plastic housing.

In an additional advantageous embodiment of the sensor arrangement, the housing of the sensor unit may be designed as a plastic extrusion coating which at least partially encloses the housing of the application-specific integrated circuit. This enables a simple and economical design of the sensor arrangement. A corresponding holder of the sensor unit may be integrated or integrally molded into the housing. The plastic extrusion coating may, for example, be designed in such a way that the at least one sensitive measuring element is arranged outside the housing which is designed as a plastic extrusion coating. By omitting the plastic extrusion coating in the area of the at least one sensitive measuring element, an increase in the usable air gap of typically 0.8 mm advantageously results, corresponding to the thickness of the plastic extrusion coating. The area on which the plastic housing of the application-specific integrated circuit has no plastic extrusion coating may advantageously be used as an access area for a gripping tool during the extrusion-coating process.

Exemplary embodiments of the present disclosure are depicted in the drawing and are explained in greater detail in the description below. In the drawing, identical reference numerals refer to components or elements which carry out identical or analogous functions.

DETAILED DESCRIPTION

Figure 1:
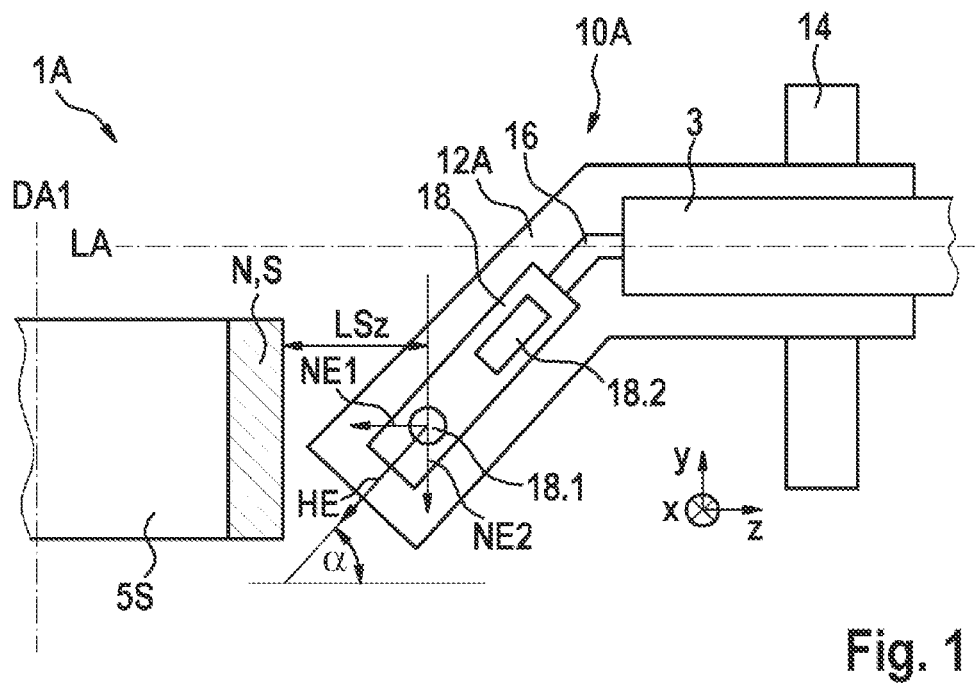
FIG. 1 shows a schematic cross-sectional view of a first exemplary embodiment of a sensor arrangement according to the present disclosure for measuring the rotational speed of a rotating component.

As is apparent from FIGS. 1 to 4, the depicted exemplary embodiments of a sensor arrangement 1A, 1B, 1C, 1D for measuring the rotational speed of a rotating component respectively comprise a rotary encoder 5S, 5B which is coupled to the rotating component and which has magnetic surface encoding having alternating magnetic north poles N and south poles S, and a sensor unit 10A, 10B which comprises a housing 12A, 12B, a connecting cable 3, and at least one sensitive measuring element 18.1 which is electrically connected to the connecting cable 3 inside the housing 12A, 12B via a contacting arrangement 16. The rotational motion of the rotary encoder 5S, 5B changes at least one spatial component of a magnetic field generated by the magnetic encoding at the location of the sensitive measuring element 18.1, said sensitive measuring element 18.1 detecting the changes in the magnetic field for ascertaining the rotational speed of the rotating component. The at least one sensitive measuring element 18.1 is arranged in the sensor unit 10A, 10B in such a way that its main detection direction HE is at a defined angle $\alpha$ with respect to the main extension direction LA of the sensor unit 10A, 10B. The at least one sensitive measuring element 18.1 detects the changes in the magnetic field caused by a rotary encoder 5S, 5B either over a first secondary detection direction NS1 running parallel to the main extension direction LA or over a second secondary detection direction NS2 running perpendicular to the main extension direction LA. As is further apparent from FIGS. 1 to 4, the angle $\alpha$ in the depicted exemplary embodiments has a value in the range from 40 to 50°, preferably a value of 45°.

The wheel rotational speed of vehicles is typically ascertained via the use of sensor arrangements 1A, 1B, 1C, 1D for measuring the rotational speed. For this purpose, magnetized rotary encoders 5S, 5B are used which are configured from a concatenation of magnetic pole pairs which respectively have a magnetic north pole and south pole. Typically, 48 pole pairs are used for one rotary encoder 5S, 5B. In the depicted exemplary embodiment, the rotary encoder 5S, 5B is configured as a drum which rotates about an axis of rotation DA, DA1, DA2, and the circumferential surface of which is configured from alternating magnetic north poles N and south poles S. Alternatively, in exemplary embodiments which are not depicted, the rotary encoder 5S, 5B may be designed as a disk rotating about an axis of rotation, the surface of which is configured from alternating circular segment-shaped north poles N and south poles S. The magnetic field generated by the alternation of the north pole N and the south pole S is measured with the aid of the at least one sensitive measuring element 18.1. The output signal level of the at least one sensitive measuring element 18.1 changes as a function of the change in the magnetic flux density. Typically, an output current change from 7 mA to 14 mA or from 14 mA to 7 mA occurs. Generally, at least two sensitive measuring elements 18.1 are used, so that in addition to the rotational speed, the direction of rotation of the rotary encoder 5S, 5B may also be determined.

The magnetic field is detected or measured via the at least one sensitive measuring element 18.1. The structure of the at least one sensitive measuring element 18.1 is manifold. For example, magnetic sensors known per se may be used as sensitive measuring elements 18.1, and may be designed as AMR sensors, GMR sensors, TMR sensors, or generally as xMR sensors, depending on their use and area of application. In the depicted exemplary embodiment, the at least one sensitive measuring element 18.1 being used is part of an application-specific integrated circuit 18 (ASIC) having a plastic housing which, in addition to the at least one sensitive measuring element 18.1, comprises an evaluation and control unit 18.2 which evaluates the detected magnetic field changes for ascertaining the rotational speed of the rotating component or rotary encoder 5S, 5B. The at least one sensitive measuring element 18.1 may be designed as a half bridge or full bridge. In the case of the use of a full bridge, a greater change in resistance results.

As is further apparent from FIGS. 1 to 4, the housing 12A, 12B of the sensor unit 10A, 10B is designed as a plastic extrusion coating which at least partially encloses the plastic housing of the application-specific integrated circuit 18.

Figure 2:
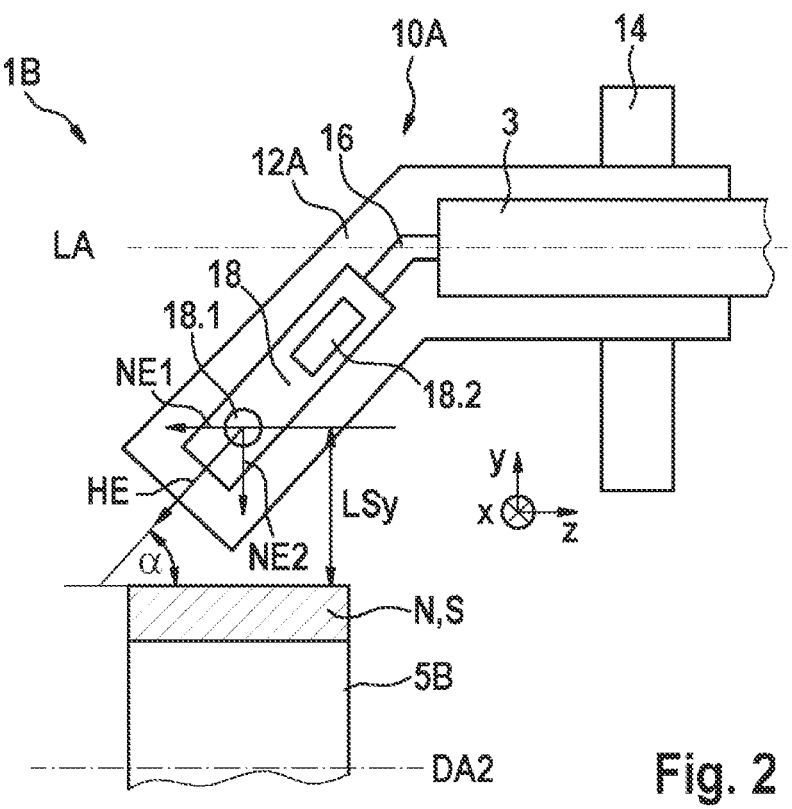
FIG. 2 shows a schematic cross-sectional view of a second exemplary embodiment of a sensor arrangement according to the present disclosure for measuring the rotational speed of a rotating component.

As is further apparent in FIGS. 1 and 2, the plastic housing of the application-specific integrated circuit 18 in the depicted first embodiment of the sensor unit 10A is completely extrusion-coated with plastic, preferably a polyamide.

Figure 3:
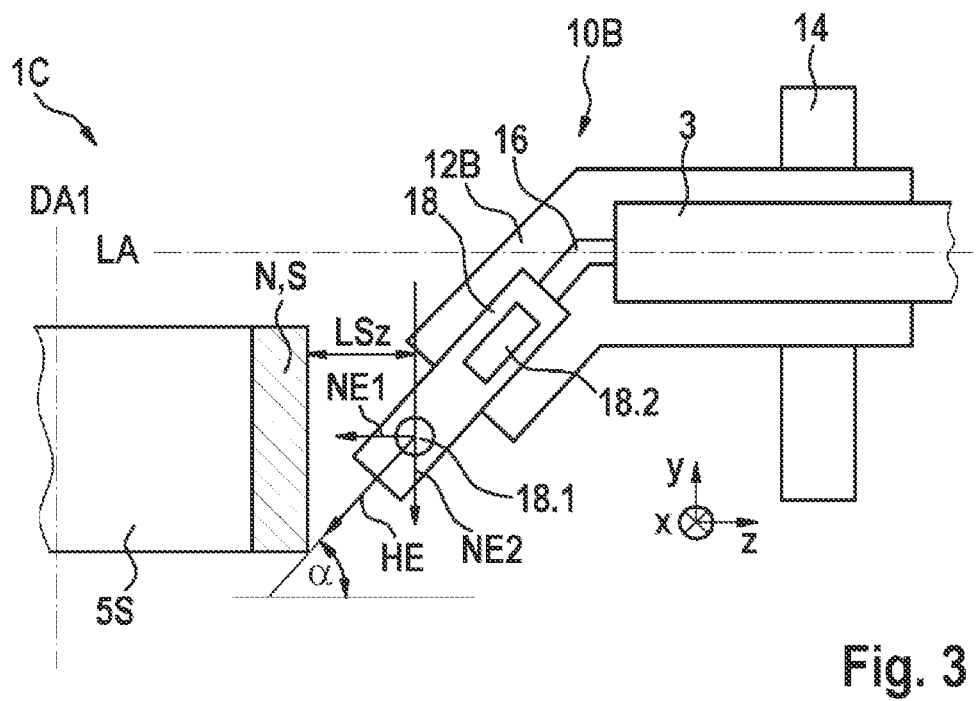
FIG. 3 shows a schematic cross-sectional view of third exemplary embodiment of a sensor arrangement according to the present disclosure for measuring the rotational speed of a rotating component.
Figure 4:
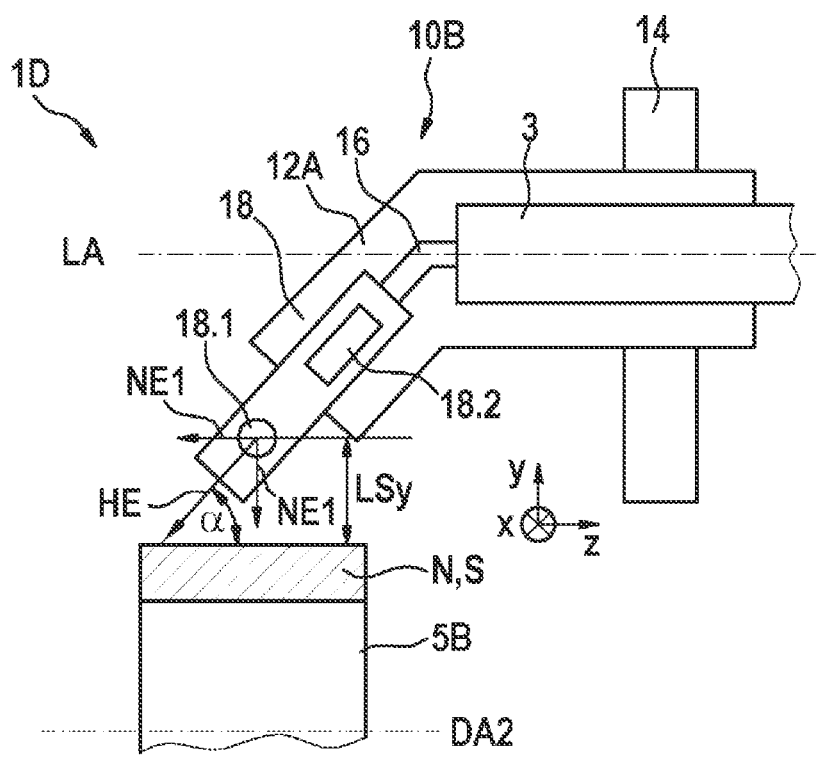
FIG. 4 shows a schematic cross-sectional view of a fourth exemplary embodiment of a sensor arrangement according to the present disclosure for measuring the rotational speed of a rotating component.

As is further apparent from FIGS. 3 and 4, the plastic housing of the application-specific integrated circuit 18 in the depicted second exemplary embodiment of the sensor unit 10B is extrusion-coated with plastic, preferably a polyamide, in such a way that at least the at least one sensitive measuring element 18.1 is arranged outside the housing of the 12B of the sensor unit 10B which is designed as a plastic extrusion coating. By omitting the plastic extrusion coating in the area of the at least one sensitive measuring element 18.1, an increase in the usable air gap LSz, LSy of typically 0.8 mm advantageously results, corresponding to the thickness of the plastic extrusion coating. Advantageously, the area on which the plastic housing of the application-specific integrated circuit 18 has no plastic extrusion coating may be used as an access area for the gripping tool 7, 9 during the extrusion-coating process, as is apparent from FIG. 5.

As is further apparent from FIGS. 1 and 3, in the case of the depicted side-read rotational speed sensor arrangement 1A, 1C, a first air gap LSz is specified between the rotary encoder 5S and the sensor unit 10A, 10B, in a first spatial direction z which runs parallel to the main extension direction LA. The magnetic field changing in the x-direction, of the rotary encoder 5S rotating about the first axis of rotation DA1, is detected or measured via the at least one sensitive measuring element 18.1. The at least one sensitive measuring element 18.1 has a constant spacing from the rotary encoder 5S in the z-direction, which corresponds to the first air gap LSz. The first axis of rotation DA1 runs parallel to the y-direction. Due to the defined angle α and the rotation of the at least one sensitive measuring element 18.1 about an axis of rotation running parallel to the x-direction, the position of the at least one sensitive measuring elements 18.1 changes with respect to the rotary encoder 5S in the y-direction, so that the at least one sensitive measuring element 18.1 no longer detects the changes in the magnetic field in the main detection direction HE, but rather in the first secondary detection direction NE1.

As is further apparent from FIGS. 2 and 4, in the case of the depicted bottom-read rotational speed sensor arrangement 1B, 1D, a second air gap LSy is specified between the rotary encoder 5B and the sensor unit 10A, 10B, in a second spatial direction y which runs perpendicular to the main extension direction LA. The magnetic field changing in the x-direction, of the rotary encoder 5B rotating about the second axis of rotation DA2, is detected or measured via the at least one sensitive measuring element 18.1. The at least one sensitive measuring element 18.1 has a constant spacing from the rotary encoder 5B in the y-direction, which corresponds to the second air gap LSy. The second axis of rotation DA2 runs parallel to the z-direction. Due to the defined angle α and the rotation of the at least one sensitive measuring element 18.1 about an axis of rotation running parallel to the x-direction, the position of the at least one sensitive measuring element 18.1 changes with respect to the rotary encoder 5B in the z-direction, so that the at least one sensitive measuring element 18.1 no longer detects the changes in the magnetic field in the main detection direction HE, but rather in the second secondary detection direction NE2.

The spacing or air gap LSz, LSy between the at least one sensitive measuring element 18.1 and the respective rotary encoder 5S, 5B is thus identical for both application cases, the side-read rotational speed sensor arrangement 1A, 1C or the bottom-read rotational speed sensor arrangement 1B, 1D. This means that the sensor unit 10A, 10B behaves equivalently in terms of circuit technology in both application cases. Thus, the side-read rotational speed sensor arrangement and the bottom-read rotational speed sensor arrangement 1A, 1C may be constituted by one design of the sensor unit 10A, 10B. An adjustment of the length of the angled portion of the sensor unit 10A, 10B may be carried out if necessary.

Figure 6:
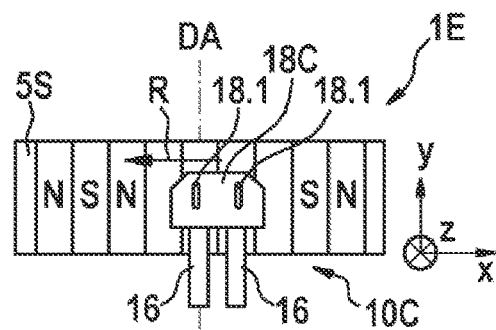
FIG. 6 shows a schematic side view of a sensor arrangement known from the prior art for measuring the rotational speed of a rotating component.
Figure 7:
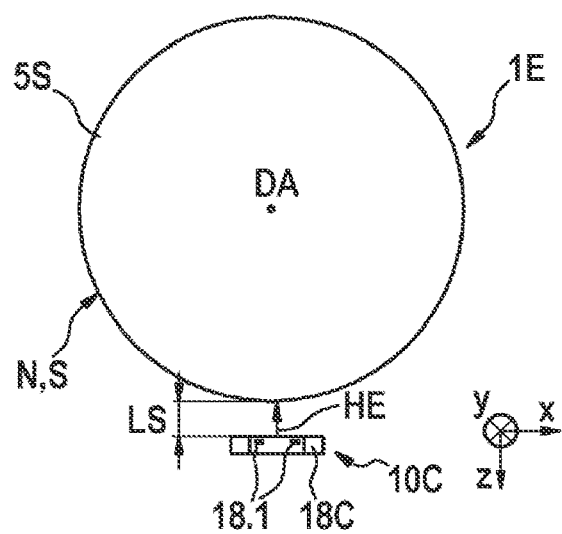
FIG. 7 shows a schematic top view of the sensor arrangement known from the prior art for measuring the rotational speed of a rotating component from FIG. 6.

As is apparent from FIGS. 6 and 7, in the depicted sensor arrangement 1E which is known from the prior art, the sensor unit 10C is arranged in such a way that the sensing surfaces of the sensitive measuring elements 18.1 run parallel to the circumferential surface of the rotary encoder 5S, 5B and to the magnetic surface encoding having the alternating north poles N and south poles S, having a defined air gap LS. This means that in the depicted conventional sensor arrangement 1E for measuring the rotational speed, the main detection direction HE of the sensitive measuring elements 18.1 runs perpendicular to the magnetic surface encoding having the alternating magnetic north poles N and south poles S. From this dependence of the arrangement, it results that for the sensor unit 10C, it is necessary to develop one design for a rotary encoder 5S arranged laterally next to the sensor unit 10C, and one design for a rotary encoder arranged below the sensor unit C.

As already indicated above, the at least one sensitive measuring element 18.1 is arranged in such a way in the sensor unit 10A, 10B that its main detection direction HE is at a defined angle α in the range between 40 to 50° with respect to the main extension direction LA of the sensor unit 10A, 10B. The manufacture of the first sensor unit 10A for the exemplary embodiments of the sensor arrangements 1A, 1B depicted in FIGS. 1 and 2 for measuring the rotational speed of a rotating component takes place in that the plastic housing of the application-specific integrated circuit 18 (ASIC) is inserted into a holder which is not depicted and is extrusion-coated with plastic, preferably a polyamide, wherein the contacting arrangement 16 is electrically connected to the connecting cable 3 before the insertion and is bent at a defined angle α during the insertion. The holder, which is not depicted, is inserted into the sensor unit 10A and remains there. Thus, the holder is not reusable.

As is apparent from FIG. 5, using gripping tools 7, 9, the plastic housing of the application-specific integrated circuit 18 (ASIC) of the second embodiment of the sensor unit 10B may be positioned via the gripping tools 7, 9 and bent by the defined angle α and subsequently extrusion-coated. The area to which the plastic housing of the application-specific integrated circuit 18 (ASIC) is clamped via the gripping tool 7 is not extrusion-coated. By omitting the plastic extrusion coating in the area of the at least one sensitive measuring element 18.1, the above-described increase in the usable air gap LSy, LSz results, corresponding to the thickness of the plastic extrusion coating of typically 0.8 mm.

The gripping tools 7, 9 may be designed as machinery which routes one or multiple plastic housings of the application-specific integrated circuit 18 (ASIC) in parallel with the manufacturing process and holds them in position during the course of the manufacturing process. In addition, the gripping tools 7, 9 provide the option of manufacturing the cable routing in a simplified manner, in that the connecting cable 3 is clamped into the gripping tool 9. The connecting cable 3 is electrically connected beforehand to the application-specific integrated circuit 18 (ASIC) via the contacting arrangement 16. The connecting cable 3 is mechanically tensioned and is subsequently encapsulated with plastic along with the contacting arrangement 16 and the plastic housing of the application-specific integrated circuit 18 (ASIC). To implement a defined media thickness, the length of the plastic housing of the application-specific integrated circuit 18 (ASIC) or the degree of plastic extrusion coating may be correspondingly chosen, in order to increase the ruggedness with respect to penetrating media. An additional approach for media impermeability may be implemented via a protective coating of the plastic housing of the application-specific integrated circuit 18 (ASIC) and the plastic extrusion coating. One example is dipping the sensor unit 10B in a sealing substance.

Figure 5:
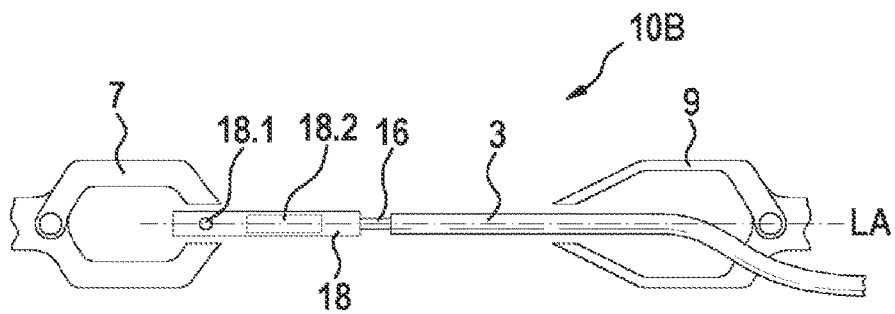
FIG. 5 shows a schematic representation of a sensor unit for the sensor arrangement according to the present disclosure for measuring the rotational speed of a rotating component from FIGS. 3 and 4 during manufacture.

As is further apparent from FIG. 5, the use of gripping tools 7, 9 enables higher flexibility with respect to the angle α of the its main detection direction HE of the at least one sensitive measuring element 18.1 with respect to the main extension direction LA of the sensor unit 10B.

The adjustability of the gripping tools 7, 9 is advantageous, so that no new tool is required when changing the positioning of the plastic housing of the application-specific integrated circuit 18 (ASIC) or the angle α.

The method for manufacturing a sensor unit 10B for the sensor arrangement 1C, 1D thus comprises the steps of: Connecting the contacting arrangement 16 of the sensor unit 10B to the connecting cable 3. Gripping the sensor unit 10B and the connecting cable 3 using a gripping tool 7, 9 in each case. Positioning the sensor unit 10B by bending the contacting arrangement 16, so that the main detection direction HE of the at least one sensitive measuring element 18.1 of the sensor unit 10B is at the defined angle α with respect to the extension direction LA. Extrusion-coating the sensor unit 10B and the contacting arrangement 16 with plastic.

The invention claimed is:

1. A sensor arrangement for measuring a rotational speed of a rotating component, comprising:
    a rotary encoder coupled to a rotating component and including a magnetic surface encoding having alternating magnetic north poles and south poles; and
    a sensor unit including:
        a housing;
        a connecting cable;
        at least one sensitive measuring element positioned in the sensor unit such that a main detection direction of the at least one sensitive measuring element is at a predetermined angle relative to a main extension direction of the sensor unit; and
        a contacting arrangement that electrically connects the at least one sensitive measuring element to the connecting cable inside the housing;
    wherein rotational motion of the rotary encoder causes a change in at least one spatial component of a magnetic field generated by the magnetic encoding at the at least one sensitive measuring element; and
    wherein the at least one sensitive measuring element has a first secondary detection direction running parallel to the main extension direction of the sensor unit and a second secondary detection direction running perpendicular to the main extension direction of the sensor unit, the sensor unit configured to detect the change in the magnetic field along one of the first and second secondary detection directions to enable ascertaining of a rotational speed of the rotating component.

2. The sensor arrangement as claimed in claim 1, wherein the predetermined angle has a value in the range of 40 to 50°.

3. The sensor arrangement as claimed in claim 2, wherein the predetermined angle has a value of 45°.

4. The sensor arrangement as claimed in claim 1, wherein the rotary encoder is spaced apart from the sensor unit in a first spatial direction which runs parallel to the main extension direction by a first air gap.

5. The sensor arrangement as claimed in claim 1, wherein the rotary encoder is spaced apart from the sensor unit in a second spatial direction which runs perpendicular to the main extension direction by a second air gap.

6. The sensor arrangement as claimed in claim 1, wherein the sensor unit further includes an evaluation and control unit configured to evaluate the change in the magnetic field to enable the ascertaining of the rotational speed of the rotating component.

7. The sensor arrangement as claimed in claim 6, wherein the at least one sensitive measuring element and the evaluation and control unit are embodied as an application-specific integrated circuit having a plastic housing.

8. The sensor arrangement as claimed in claim 7, wherein the housing is a plastic extrusion coating that at least partially encloses the plastic housing of the application-specific integrated circuit.

9. The sensor arrangement as claimed in claim 8, wherein:
    the housing is a plastic extrusion coating; and
    the at least one sensitive measuring element is positioned outside the housing.

10. The sensor arrangement as claimed in claim 1, wherein the at least one sensitive measuring element is a magnetoresistive sensor element.

11. The sensor arrangement as claimed in claim 1, wherein:
    the rotary encoder has an axis of rotation about which the rotary encoder rotates so as to change the at least one spatial component of the magnetic field, and the sensor unit is arranged such that the one of the first and second secondary detection directions is perpendicular to the axis of rotation.

12. The sensor arrangement as claimed in claim 1, wherein the main detection direction defines an angle of less than 90 degrees relative to the magnetic surface encoding of the rotary encoder.

13. A method of manufacturing a sensor unit for a sensor arrangement for measuring a rotational speed of a rotating component, comprising:
   connecting a contacting arrangement of a sensor unit that includes at least one sensitive measuring element to a connecting cable;
   gripping each of the sensor unit and the connecting cable with a gripping tool, and positioning the sensor unit by bending the contacting arrangement, so that a main detection direction of the at least one sensitive measuring element of the sensor unit is at a predetermined angle with respect to a main extension direction of the sensor unit, the at least one sensitive measuring element has a first secondary detection direction running parallel to the main extension direction of the sensor unit and a second secondary detection direction running perpendicular to the main extension direction of the sensor unit, the sensor unit configured to detect the change in the magnetic field along one of the first and second secondary detection directions to enable ascertaining of a rotational speed of the rotating component; and
   extrusion-coating the sensor unit and the contacting arrangement with plastic.

14. The method as claimed in claim 13, further comprising:
   arranging the sensor unit is such that the one of the first and second secondary detection directions is perpendicular to an axis of rotation of a rotary encoder that is coupled to a rotating component and includes a magnetic surface encoding having alternating magnetic north poles and south poles.

15. The method as claimed in claim 13, further comprising:
   arranging the sensor unit such that the main detection direction defines an angle of less than 90 degrees relative to a magnetic surface encoding of a rotary encoder.

* * * * *